(12) United States Patent
Gabrielli et al.

(10) Patent No.: US 7,497,495 B1
(45) Date of Patent: Mar. 3, 2009

(54) METHOD FOR CONCEALING A FASTENER BENEATH A FLOOR CARPET

(75) Inventors: Matthew Luigi Gabrielli, Livonia, MI (US); Kotaro Naganawa, Farmington Hills, MI (US); Lauren M. Abro, Farmington Hills, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 11/846,782

(22) Filed: Aug. 29, 2007

(51) Int. Cl.
*B62D 25/20* (2006.01)
(52) U.S. Cl. ................................. 296/97.23
(58) Field of Classification Search ............. 296/24.34, 296/180.5, 97.23, 39.1, 39.3, 65.09, 39.2, 296/37.8
See application file for complete search history.

(56) References Cited

U.S. PATENT DOCUMENTS

| | | | | |
|---|---|---|---|---|
| 2,109,402 | A * | 2/1938 | Place ............................... | 16/4 |
| 2,278,691 | A * | 4/1942 | Cotter ........................ | 248/73 |
| 2,779,048 | A * | 1/1957 | Larabell ................... | 296/97.23 |
| 3,046,056 | A * | 7/1962 | Greene et al. ............... | 297/482 |
| 4,285,093 | A * | 8/1981 | Kundin .......................... | 16/17 |
| 4,588,628 | A * | 5/1986 | Roth ........................ | 296/97.23 |
| 4,829,627 | A * | 5/1989 | Altus et al. ............... | 296/97.23 |
| 4,991,457 | A | 2/1991 | Chen | |
| 5,048,083 | A | 9/1991 | Dunchock | |
| 5,060,906 | A | 10/1991 | Gayle | |
| 5,106,143 | A | 4/1992 | Soeters | |
| 5,131,036 | A | 7/1992 | Dunchock | |
| 5,150,406 | A | 9/1992 | Dunchock | |
| 5,192,599 | A * | 3/1993 | Sakamoto ........................ | 16/4 |
| 5,280,994 | A * | 1/1994 | Masui et al. ............. | 297/219.1 |
| 5,609,382 | A | 3/1997 | Schmid et al. | |
| 5,620,546 | A * | 4/1997 | Reuben ...................... | 156/219 |
| 5,671,948 | A * | 9/1997 | Susko et al. ................ | 296/68.1 |
| 6,338,429 | B1 | 1/2002 | Pesce | |
| 6,485,055 | B1 * | 11/2002 | Swayne et al. ........... | 296/65.03 |
| 6,644,705 | B2 | 11/2003 | Wikman et al. | |
| 7,207,619 | B2 * | 4/2007 | Yamamoto ............... | 296/65.03 |

FOREIGN PATENT DOCUMENTS

DE 4023126 3/1991

* cited by examiner

*Primary Examiner*—Kiran B. Patel
(74) *Attorney, Agent, or Firm*—Gifford, Krass, Sprinkle, Anderson & Citkokwski, P.C.

(57) ABSTRACT

A method for concealing a fastener beneath a floor carpet in an automotive vehicle. A flap is first cut in the carpet and that flap is retracted away from an opening in the carpet formed by the flap. An object, such as a floor console, is then attached to the vehicle by securing the object to the vehicle with a fastener extending through a portion of the object aligned with the carpet opening. The flap is then replaced in the opening to conceal the fastener.

6 Claims, 2 Drawing Sheets

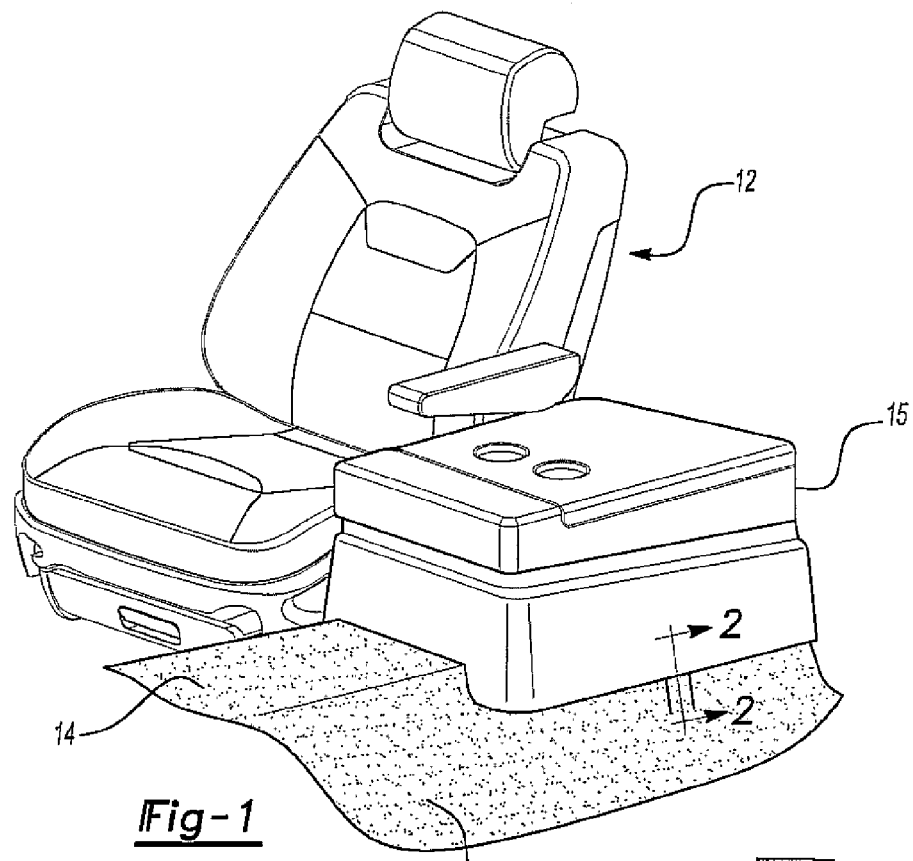
*Fig-1*
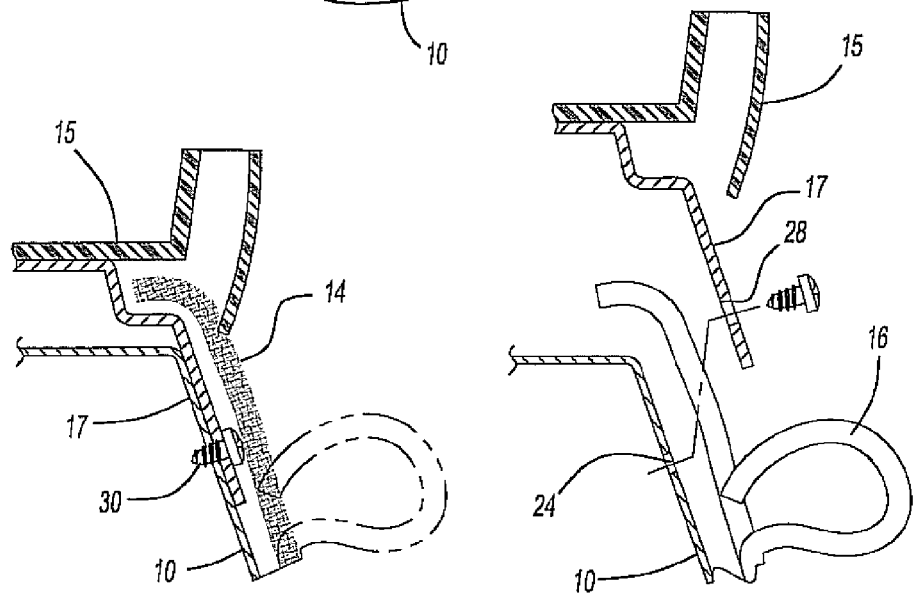
*Fig-2*  *Fig-3*

METHOD FOR CONCEALING A FASTENER BENEATH A FLOOR CARPET

BACKGROUND OF THE INVENTION

I. Field of the Invention

The present invention relates to a method for concealing a fastener beneath a floor carpet in an automotive vehicle.

II. Description of Material Art

There are many fasteners for attaching various objects within the passenger compartment of an automotive vehicle. Such objects include, for example, a floor console positioned between front bucket seats of the automotive vehicle.

It is highly desirable to hide these fasteners following installation of the object for aesthetic reasons. Consequently, when installing objects such as the floor console, it is highly desirable to position the fasteners such that they will be covered by the console following the installation.

In some instances, however, the console or other object within the passenger compartment of the vehicle must be installed on the vehicle after the installation of the floor carpet and in which the fasteners will not be hidden by the floor console itself. In these situations, a bolt is traditionally installed directly through the carpet and the object installed, such as a console, and into the vehicle. The exposed fastener is then covered by a plastic cap or other cover.

While covering the head of the fastener with a plastic cover is certainly more desirable than leaving the head of the fastener exposed, such caps are disadvantageous for a number of different reasons. First, the caps add an additional cost, both in material as well as installation, for the overall vehicle. Secondly, such caps may become dislodged and result in exposing the heads of the fasteners. Lastly, while such caps are aesthetically more pleasing than the exposed fastener, the cap itself is still more unsightly than the vehicle floor carpet.

SUMMARY OF THE PRESENT INVENTION

The present invention provides a method which overcomes the above-mentioned disadvantages of the previously known methods for hiding fastener heads.

In brief, in the present invention a flap is cut in the carpet and the flap is retracted to form an opening in the carpet. Thereafter, an object, such as a floor console, is secured to the vehicle by a fastener extending through a portion of the object which is aligned with the carpet opening.

After the object is installed in the vehicle, the flap is then replaced within the opening thus overlying and covering a head of the fastener. Preferably, a free end of the flap is positioned under a portion of the object so that the object maintains the flap within its opening.

In order to lock the flap in the opening, preferably a free end of the flap includes an enlarged portion. This enlarged portion fits within the opening cut through the carpet to form the flap which effectively locks the flap in position in the carpet.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is a fragmentary elevational view of an automotive vehicle;

FIG. 2 is a side sectional view taken along line 2-2 in FIG. 1, enlarged for clarity and illustrating a first step of the present invention;

FIG. 3 is a view similar to FIG. 1, but illustrating a further step of the present invention;

DETAILED DESCRIPTION OF A PREFERRED EMBODIMENT OF THE PRESENT INVENTION

Figure 4:
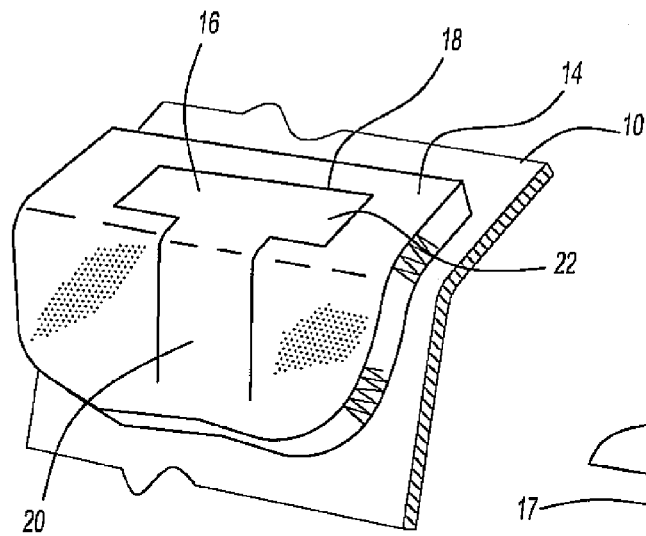
FIG. 4 is an elevational view of the step shown in FIG. 3.

With reference first to FIGS. 1 and 2, a portion of a floor 10 of an automotive vehicle 12 is illustrated. A mounting bracket 17 of an object 15, hereinafter referred to as a console 15, is attached to the floor 10 by a fastener 30 (FIG. 2). Furthermore, a floor carpet 14 covers the portion 10 of the automotive vehicle 12.

With reference to FIG. 4, as a first step, a flap 16 is first cut through the floor carpet 14. This flap 16 includes a free end 18 while an opposite end 20 of the flap 16 remains attached to the floor carpet 14.

Although the flap 16 may take any of a number of different shapes, preferably the flap 16 includes an enlarged portion 22 at its free end. As shown in FIG. 4, this enlarged portion 22 is in the form of a top of a T-shaped flap. However, no unnecessary limitations should be drawn therefrom since the enlarged portion 22 may take any other shape without deviation from the spirit or scope of the invention.

Figure 5:
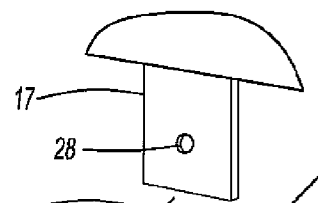
FIG. 5 is a view similar to FIG. 4, but illustrating a further step of the present invention.

With reference now to FIGS. 3 and 5, after the flap 16 has been cut through the floor carpet 14, the flap 16 is retracted thus forming an opening 23 in the floor carpet 14 corresponding to the shape of the flap 16. Furthermore, the flap 16 overlies the fastener opening 24 formed in the vehicle floor 10. As such, upon retraction of the flap to the position shown in FIGS. 3 and 5, the fastener opening 24 is exposed.

Figure 6:
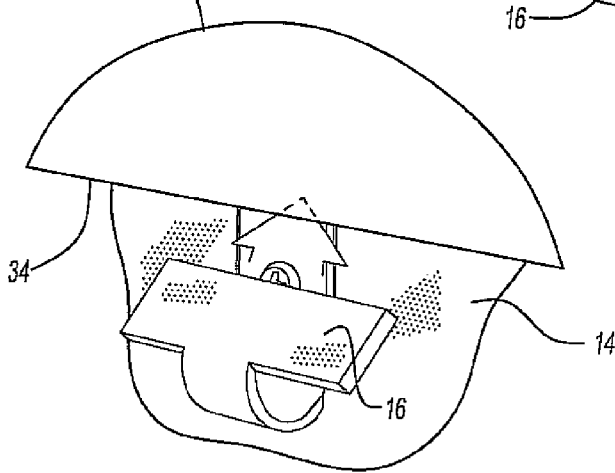
FIG. 6 is a view similar to FIGS. 4 and 5, but illustrating a further step of the present invention.

The floor console 15, or other object, is then moved from the position shown in FIGS. 3 and 5 and to the position shown in FIGS. 2 and 6 so that a fastener opening 28 in the bracket 17 aligns with the fastener opening 24 in the vehicle floor 10. At this time, the bracket 17 is positioned within the opening 23 formed by the flap 16 when retracted.

With reference now to FIG. 2, with the console bracket 17 positioned within the opening 23, the fastener 30, such as a bolt, is then driven through the bracket opening 28 and into the fastener opening 24 to secure the bracket 17, and thus the console 24, to the vehicle 12.

As shown in FIG. 6, after the console bracket 26 has been secured to the vehicle 14 by the fastener 30, the carpet flap 16 is then slid under a side 34 of the console 15 and is replaced within the carpet opening 23 as shown in FIG. 5 thus covering the fastener 30. Upon doing so, the enlarged area portion 22 fits within the opening 23 and effectively interlocks the flap 16 within the opening 23 due to the enlarged area portion 22 of the flap 16. Consequently, the enlarged area portion 23 of the flap 16 effectively prevents the flap 16 from retracting away from its opening 22.

Although the object installed within the passenger compartment of the automotive vehicle has been described as a console, it will be understood, of course, that the present method for concealing a fastener beneath a floor carpet in the automotive vehicle may be used for other types of objects within the passenger compartment. Having described my invention, however, many modifications thereto will become apparent to those skilled in the art to which it pertains without deviation from the spirit of the invention as defined by the scope of the appended claims.

We claim:

1. A method for concealing a fastener beneath a floor carpet in an automotive vehicle comprising the steps of:
    cutting a flap in the carpet,
    retracting said flap away from an opening in the carpet formed by said flap,
    attaching an object to the vehicle by securing the object to the vehicle with a fastener extending through a portion of the object aligned with the carpet opening,
    replacing the flap in the opening.

2. The invention as defined in claim 1 and further comprising the step of positioning a portion of the flap under a portion of the object.

3. The invention as defined in claim 1 wherein the object comprises a front console.

4. The invention as defined in claim 1 wherein said flap includes an enlarged area portion at its free end.

5. The invention as defined in claim 1 wherein said flap is generally T-shaped.

6. The invention as defined in claim 1 wherein said fastener comprises a bolt.

* * * * *